(12) United States Patent
Choi et al.

(10) Patent No.: US 7,354,240 B2
(45) Date of Patent: Apr. 8, 2008

(54) CENTRIFUGAL TURBO MACHINE WITH AXIAL THRUST CONTROL MEMBER

(75) Inventors: Chang-Ho Choi, Daejeon (KR); Jinhan Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 186 days.

(21) Appl. No.: 11/304,759

(22) Filed: Dec. 16, 2005

(65) Prior Publication Data

US 2007/0140834 A1  Jun. 21, 2007

(51) Int. Cl.
  *F01D 3/00* (2006.01)
(52) U.S. Cl. .................. 415/104; 415/170.1
(58) Field of Classification Search ............... 415/104, 415/170.1
  See application file for complete search history.

(56) References Cited

U.S. PATENT DOCUMENTS 4,047,847 A * 9/1977 Oikawa ...................... 417/370
5,320,482 A * 6/1994 Palmer et al. ............... 415/104
6,502,994 B2 * 1/2003 Jackson ...................... 384/420

\* cited by examiner

*Primary Examiner*—Edward K. Look
*Assistant Examiner*—Devin Hanan
(74) *Attorney, Agent, or Firm*—Sughrue Mion PLLC (57) ABSTRACT

There is provided a centrifugal turbo machine comprising: a volute casing; a rotation axis coupled with the volute casing through a bearing; an impeller which is coupled to an end of the rotation axis and sucks fluid with a centrifugal force due to its rotation; and an axial thrust control member which is coupled to the volute casing at the rear of the impeller in a direction in which the fluid flows and prevents rotation of the fluid by the impeller. It is easy to fabricate and install the centrifugal turbo machine and it is possible to reduce the difference in static pressure of fluid by using the economical axial thrust control member so as to prevent the generation of the axial thrust, which results in damage of the bearing, etc. Therefore, it is possible to stably operate the centrifugal turbo machine.

2 Claims, 8 Drawing Sheets

CENTRIFUGAL TURBO MACHINE WITH AXIAL THRUST CONTROL MEMBER

BACKGROUND OF THE INVENTION 1. (a) Field of the Invention

The present invention relates to a centrifugal turbo machine and more particularly to a centrifugal turbo machine which can properly control an axial thrust resulting from the difference in static pressure at the front and rear of an impeller in a centrifugal pump or compressor.

2. (b) Description of the Related Art

In general, a centrifugal turbo machine gives kinetic energy (dynamic pressure) to fluid by means of a reaction due to rotation of a rotor and converts the kinetic energy into pressure energy (static pressure). Examples of such a centrifugal turbo machine can include a centrifugal pump, a centrifugal compressor, and the like.

Figure 1:
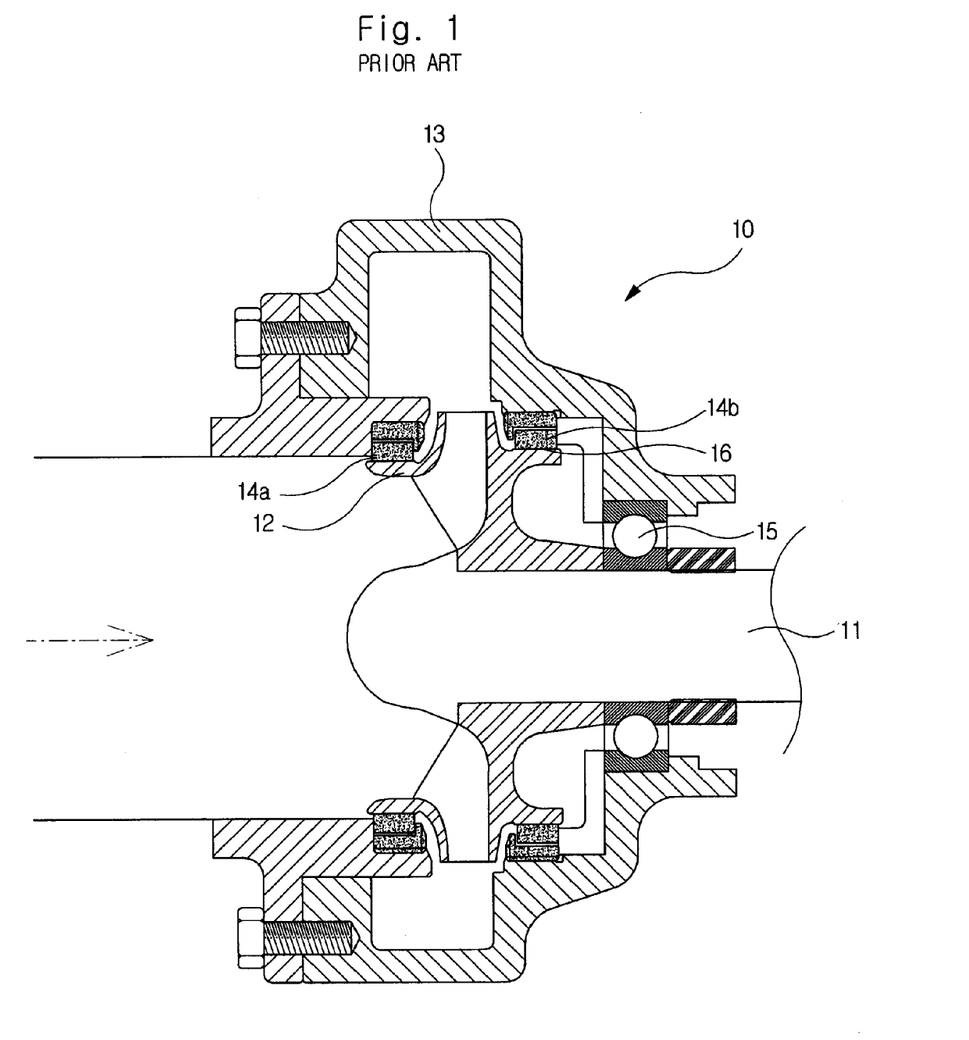
FIG. 1 is a cross-sectional view illustrating a conventional centrifugal turbo machine.

The structure shown in FIG. 1 was usually used in the centrifugal turbo machine for converting the kinetic energy given to the fluid into the pressure energy.

Referring to the figure, the centrifugal turbo machine 10 includes a rotation axis 11, an impeller 12, a volute casing 13, and seals 14a and 14b.

The rotation axis 11 is rotatably coupled to the volute casing 13 through a bearing 15.

The impeller 12 is coupled to the rotation axis 11 and sucks in fluid with a centrifugal force generated by the rotation of the impeller 12.

The fluid sucked by the impeller 12 flows in the volute casing 13 and the dynamic pressure of the sucked fluid is converted into the static pressure therein. That is, the kinetic energy of the sucked fluid is converted into the pressure energy.

The seals 14a and 14b prevent leakage of the fluid to enhance efficiency of the centrifugal turbo machine 10, and are provided at the front and rear of the impeller 12, respectively.

The operation principle of the centrifugal turbo machine 10 is now described.

In order to suck fluid into the volute casing 13, the impeller 12 is rotated in the closed volute casing 13. Then, a centrifugal force is generated in the impeller 12 and the fluid is sucked with the centrifugal force. The sucked fluid flows in the volute casing 13 and the dynamic pressure of the fluid is converted into the static pressure in the volute casing 13, thereby obtaining the pressure energy.

However, a part of the fluid sucked by the impeller 12 does not flow in the volute casing 13 but flows through gaps 16 of the seals 14a and 14b positioned at the front and rear of the impeller 12. The fluids flowing through the gaps 16 of the seals 14a and 14b at the front and rear of the impeller 12 are different in pressure from each other, thereby generating an axial thrust. That is, as shown in FIG. 1, the shapes of the front and rear surfaces of the impeller 12 are different from each other and the space between the front surface of the impeller 12 and a wall surface of the volute casing 13 adjacent thereto and the space between the rear surface of the impeller 12 and a wall surface of the volute casing 13 adjacent thereto are different in area. Accordingly, the pressure is different by places and the pressures at the outlets of the seals 14a and 14b are different from each other, so that an axial thrust is generated toward the front of the impeller 12 from the rear thereof.

Figure 2:
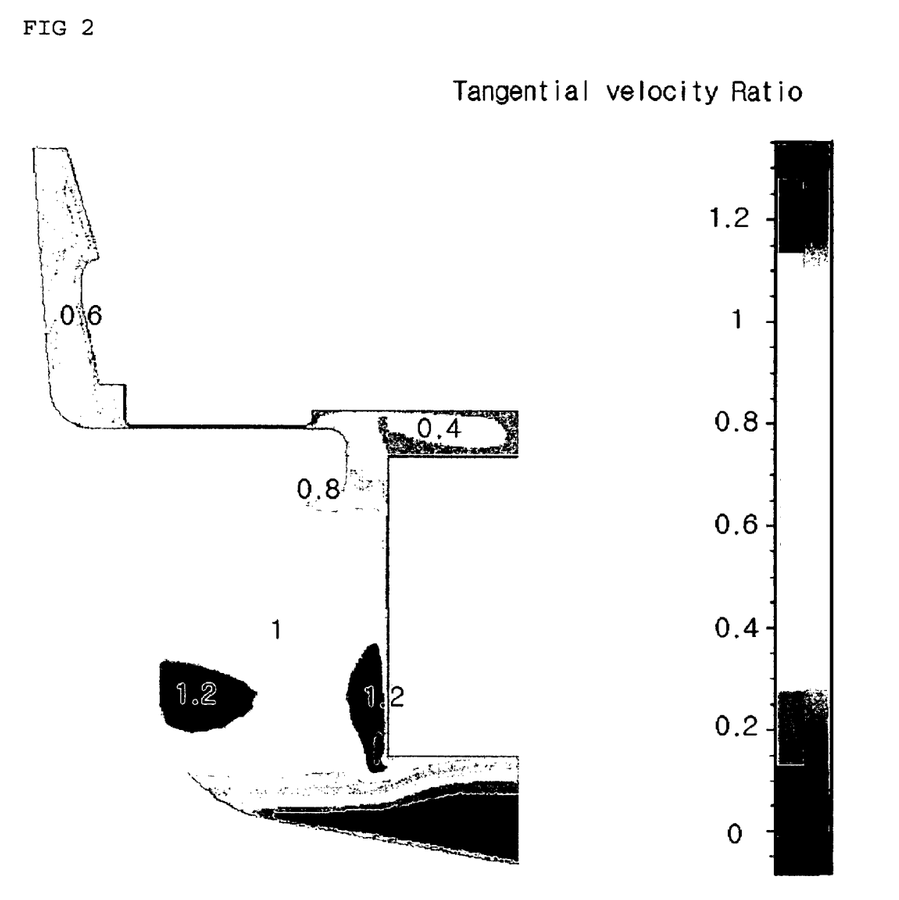
FIG. 2 is a diagram illustrating an angular velocity ratio distribution of fluid at the rear of an impeller due to rotation of the impeller shown in FIG. 1.

Referring to FIG. 2 which illustrates an angular velocity ratio distribution of the fluid flowing through the gap 16 of the seal 14b at the rear of the impeller 12, the fluid has an angular velocity ranging about 0.6 to 0.8 before passing through the seal 14b and has an angular velocity of about 0.8 or more after passing through the seal 14b.

Figure 3:
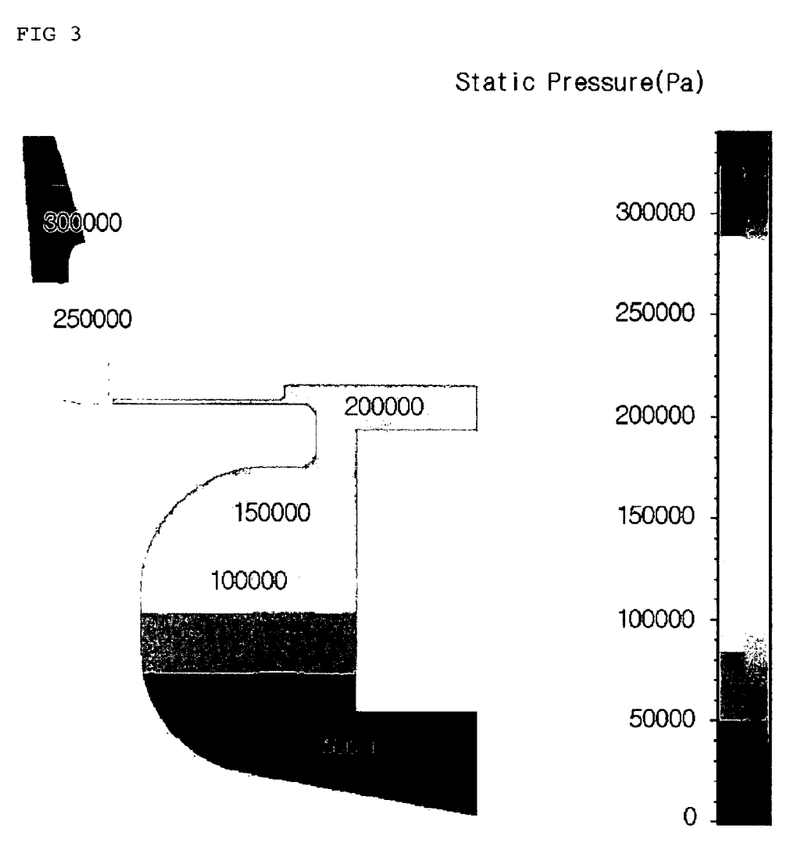
FIG. 3 is a diagram illustrating a static pressure distribution of fluid at the rear of the impeller due to rotation of the impeller shown in FIG. 1.

Therefore, as shown in FIG. 3, the static pressure is varied in the radial direction. That is, it can be seen that the static pressure, which was about 220,000 Pa before passing through the seal 14b, is gradually decreased during passing through the seal 14b. Since the static pressure of the fluid having passed through the seal 14b is decreased toward the lower side of the seal 14b but the static pressure is not constant as a whole, the axial thrust cannot be removed. The axial thrust is delivered to the bearing 15 coupled with the rotation axis 11. As the magnitude of the axial thrust delivered to the bearing 15 is increased, the pressure applied to the bearing 15 is increased, thereby causing the damage of the bearing 15.

The damage of the bearing 15 due to the axial thrust hinders the stable operation of the centrifugal turbo machine 10. Therefore, the axial thrust should be reduced to secure the stable operation of the centrifugal turbo machine 10. The different in static pressure acting on the front and rear surfaces of the impeller 12 should be decreased to reduce the axial thrust.

Conventionally, in order to decrease the difference in static pressure acting on the front and rear surfaces of the impeller 12, the radii of the seals 14a and 14b provided at the front and rear of the impeller 12 were changed, thereby changing the space between the impeller 12 and the volute casing 13. That is, a method was used which increases the radius of the seal 14b at the rear of the impeller 12 on which the great axial thrust usually acts, thereby reducing the axial thrust at the rear of the impeller 12.

However, the reduction of the axial thrust by means of the change in radius of the seals requires much time and cost for manufacturing the centrifugal turbo machine.

SUMMARY OF THE INVENTION

The present invention is contrived to solve the above-mentioned problems and it is an object of the present invention to provide a centrifugal turbo machine which can economically control an axial thrust.

According to an aspect of the present invention, there is provided a centrifugal turbo machine comprising: a volute casing; a rotation axis coupled with the volute casing through a bearing; an impeller which is coupled to an end of the rotation axis and sucks fluid with a centrifugal force due to its rotation; and an axial thrust control member which is coupled to the volute casing at the rear of the impeller in a direction in which the fluid flows and prevents rotation of the fluid by the impeller.

Herein, it is preferable that the axial thrust control member is a ring-shaped plate member and a plurality of ribs is protruded from a surface thereof facing the flow of fluid.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, embodiments of the present invention will be described in detail with reference to the attached drawings.

Figure 4:
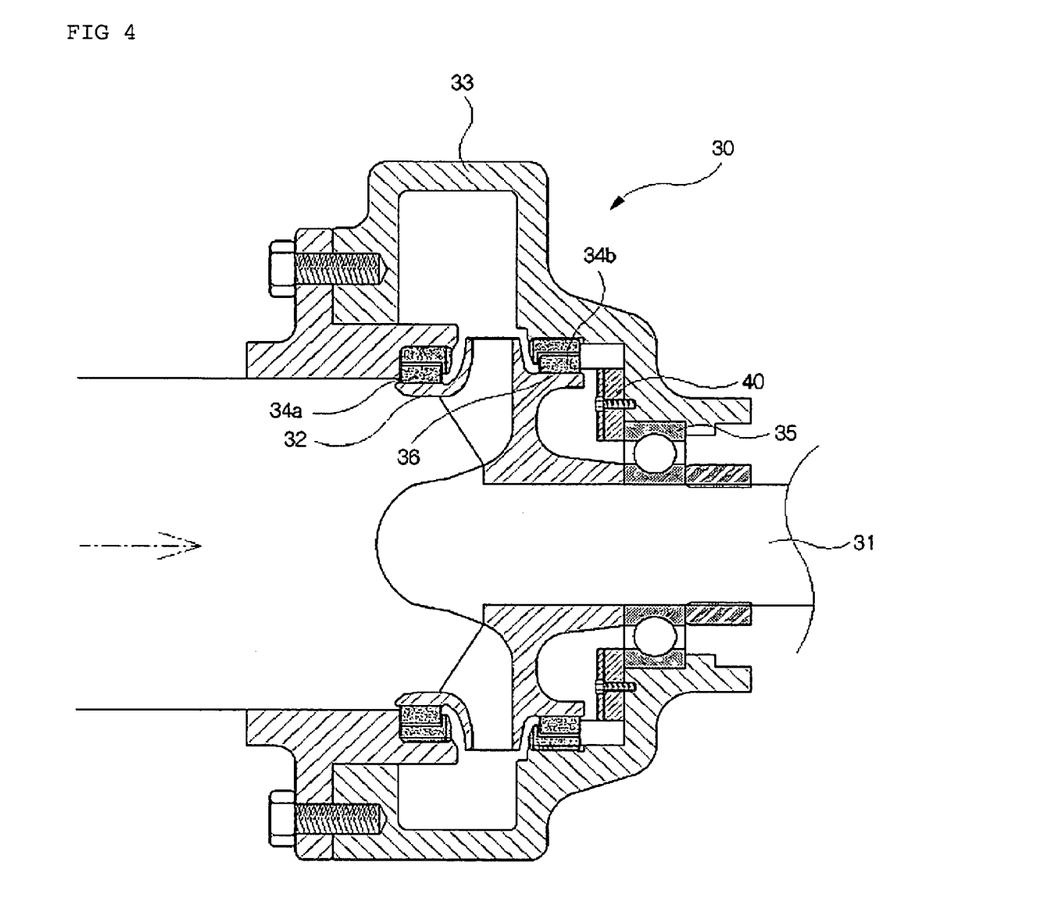
FIG. 4 is a cross-sectional view illustrating a centrifugal turbo machine according to an embodiment of the present invention.

FIG. 4 is a cross-sectional view illustrating a centrifugal turbo machine according to an embodiment of the present invention.

Referring to the figure, the centrifugal turbo machine 30 includes a volute casing 33, a rotation axis 31, an impeller 32, seals 34a and 34b, and an axial thrust control member 40.

The rotation axis 31 is rotatably coupled with the volute casing 33 through a bearing 35.

The impeller 32 is coupled to an end of the rotation axis 31 in the vicinity of a fluid inlet and rotates at a high speed by means of the rotation axis 31. The rotation of the impeller 32 generates a centrifugal force and the fluid is sucked into the volute casing 33 through the fluid inlet.

The fluid sucked by the impeller 32 flows in the volute casing 33 and the dynamic pressure of the fluid is converted into the static pressure therein.

The seals 34a and 34b prevent leakage of the fluid to enhance efficiency of the centrifugal turbo machine 30, and are provided at the front surface of the impeller 32 in the vicinity of the fluid inlet and at the rear surface of the impeller 32 opposite thereto, respectively.

Figure 5:
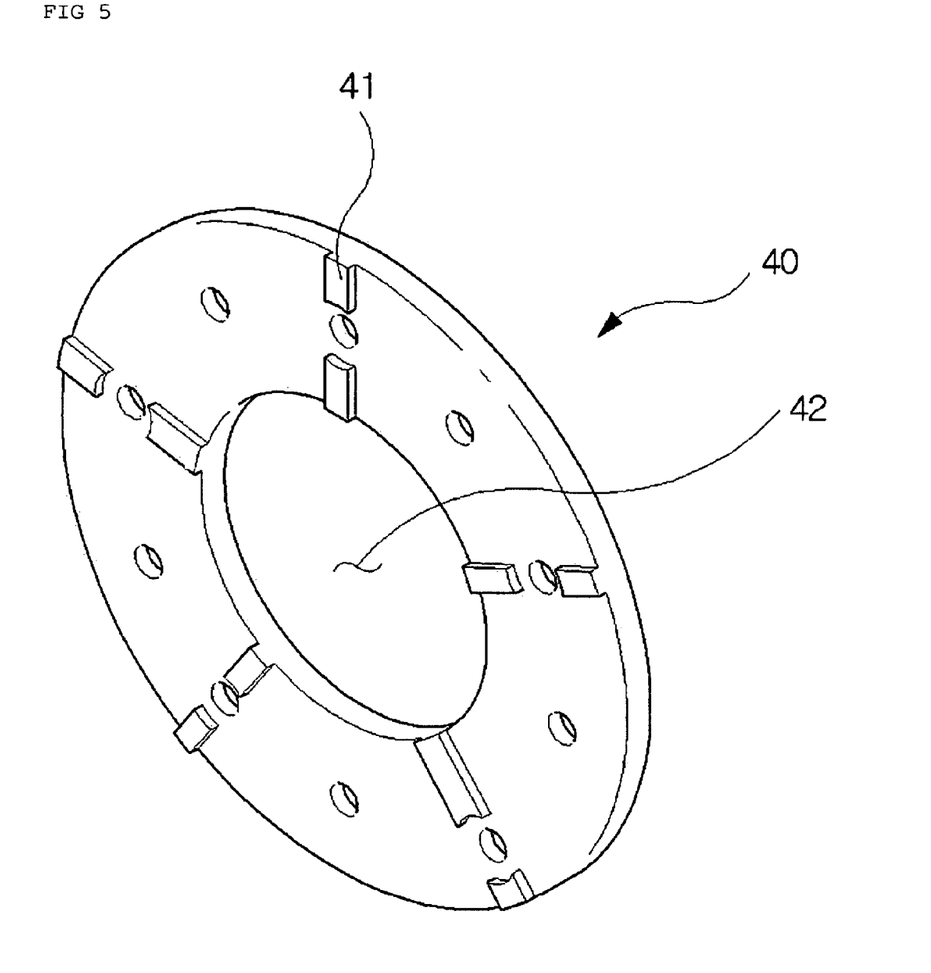
FIG. 5 is a perspective view illustrating an axial thrust control member shown in FIG. 4.

The axial thrust control member 40 is a ring-shaped plate member as shown in FIG. 5 in which a rotation axis inserting hole 42 is formed at the center and removes the axial thrust by reducing the difference in static pressure between the front and rear of the impeller 32. A plurality of ribs 41 are protruded from a surface of the axial thrust control member 40, that is, a surface facing the flow of the fluid, and serves to reduce the angular velocity of the fluid. The axial thrust control member 40 is coupled to the volute casing 33 at the rear of the impeller 32 in the direction in which the fluid flows.

The operation of the centrifugal turbo machine 30 is now described.

When the impeller 32 is rotated in the closed volute casing 33, the impeller 32 generates a centrifugal force and the fluid is sucked with the centrifugal force. The sucked fluid flows in the volute casing 33 and the dynamic pressure of the fluid is converted into the static pressure in the volute casing 33, thereby obtaining the pressure energy.

However, a part of the fluid sucked by the impeller 32 does not flow in the volute casing 33 but flows through gaps 36 of the seals 34a and 34b positioned at the front and rear of the impeller 32. The fluid parts flowing through the gaps 36 of the seals 34a and 34b at the front and rear of the impeller 32 are different in pressure from each other. This is, as shown in FIG. 4, because the shapes of the front and rear surfaces of the impeller 32 are different from each other and the space between the front surface of the impeller 32 and a wall surface of the volute casing 33 adjacent thereto and the space between the rear surface of the impeller 32 and a wall surface of the volute casing 33 adjacent thereto are different in area, thereby causing difference in distributed pressure of the fluid. At this time, the pressure is greater at the rear of the impeller 32 than at the front thereof, because the angular velocity of the fluid is greater at the rear of the impeller 32 than at the front thereof. The difference in pressure generates an axial thrust, which is delivered to the bearing 35 for supporting the rotation axis 31 to damage the bearing 35.

Therefore, in the present invention, in order to prevent generation of the axial thrust in advance, the axial thrust control member 40 is provided in the volute casing 33 at the rear of the impeller 32. The axial thrust control member 40 hinders the rotation of the fluid passing through the seal 34b at the rear of the impeller, thereby reducing the angular velocity of the fluid. That is, a plurality of ribs 41 protruded from a surface of the axial thrust control member 40 hinders the rotation of the fluid, thereby reducing the angular velocity of the fluid. Then, the static pressure at the rear of the impeller 32 is abruptly reduced during the seal 34b and is almost equal to the static pressure at the front of the impeller 32, thereby removing the axial thrust.

Now, the present invention is described in more detail with reference to FIGS. 6 to 8.

Figure 6:
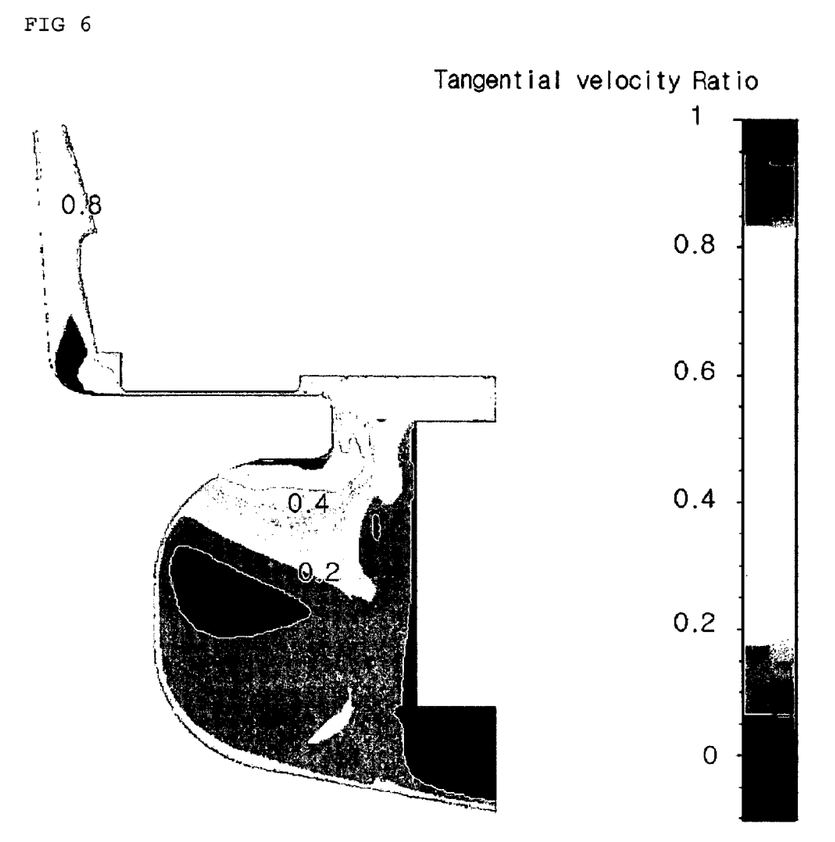
FIG. 6 is a diagram illustrating an angular velocity ratio distribution of fluid at the rear of an impeller due to rotation of the impeller shown in FIG. 4.
Figure 7:
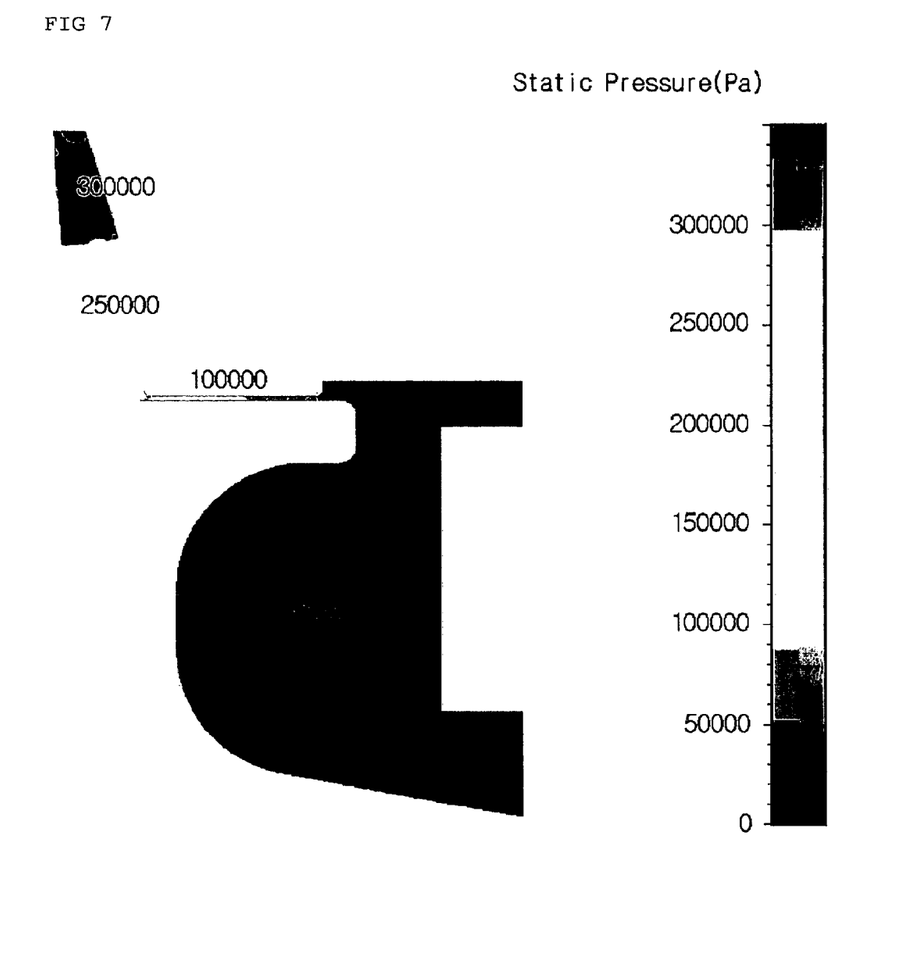
FIG. 7 is a diagram illustrating a static pressure distribution of fluid at the rear of the impeller due to rotation of the impeller shown in FIG. 4.

First, as shown in FIG. 6, the fluid at the rear of the impeller 32 has an angular velocity of about 0.6 or more in the vicinity of the inlet and is abruptly reduced to about 0.2 or less after the seal 34b. Therefore, as shown in FIG. 7, the static pressure of the fluid is 230,000 Pa or more before passing through the seal 34b and is abruptly reduced to 50,000 Pa or less after passing through the seal 34b. Accordingly, the difference in static pressure at the front and rear of the impeller 32 can be reduced, thereby preventing the generation of the axial thrust.

Figure 8:
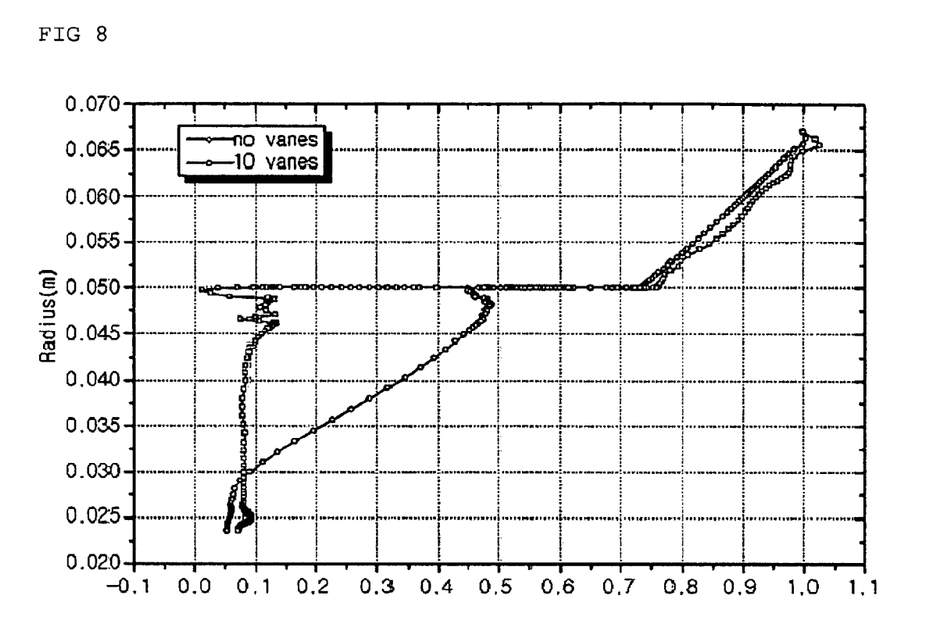
FIG. 8 is a diagram illustrating a wall pressure distribution at the rear of the impeller shown in FIGS. 1 and 4.

The reduction ratios of static pressure corresponding to existence and nonexistence of the axial thrust control member 40 at the rear of the impeller 32 are shown in FIG. 8. The radius in FIG. 8 indicates a radius of the gap 36 of the seal 34b at the rear of the impeller 32 through which the fluid passes. The static pressure of fluid is reduced during passing through the gap 36. When the axial thrust control member 40 does not exist, the static pressure of fluid is reduced along a smooth curve. On the contrary, when the axial thrust control member 40 exists, the static pressure of fluid is abruptly reduced during the passing through the gap 36.

As a result, the centrifugal turbo machine having the above-mentioned structure can remove the difference in static pressure at the front and rear of the impeller, thereby preventing the generation of the axial thrust.

It is easy to fabricate and install the centrifugal turbo machine according to the present invention described above, and it is possible to reduce the difference in static pressure of fluid by using the economical axial thrust control member so as to prevent the generation of the axial thrust, which results in damage of the bearing, etc. Therefore, it is possible to stably operate the centrifugal turbo machine.

Although the exemplary embodiments and the modified examples of the present invention have been described, the present invention is not limited to the embodiments and examples, but may be modified in various forms without departing from the scope of the appended claims.

What is claimed is:

1. A centrifugal turbo machine comprising:
   a volute casing;
   a rotation axis coupled with the volute casing through a bearing;
   an impeller which is coupled to an end of the rotation axis and sucks fluid with a centrifugal force due to its rotation; and
   an axial thrust control member which is coupled to the volute casing at the rear of the impeller in a direction in which the fluid flows and prevents rotation of the fluid by the impeller wherein the axial thrust member fixes the bearing to the volute casing.

2. The centrifugal turbo machine according to claim 1, wherein the axial thrust control member is a ring-shaped plate member and a plurality of ribs are protruded from a surface of the plate, which faces the flow of fluid.

* * * * *